(12) United States Patent
Asinovski et al.

(10) Patent No.: US 8,427,849 B2
(45) Date of Patent: Apr. 23, 2013

(54) START-UP CIRCUIT FOR POWER CONVERTERS WITH WIDE INPUT VOLTAGE RANGE

(75) Inventors: Alexander Asinovski, Stoughton, MA (US); Joseph Gonsalves, Warren, RI (US)

(73) Assignee: Murata Power Solutions, Mansfield, MA (US)

( * ) Notice: Subject to any disclaimer, the term of this patent is extended or adjusted under 35 U.S.C. 154(b) by 401 days.

(21) Appl. No.: 12/768,950

(22) Filed: Apr. 28, 2010

(65) Prior Publication Data
US 2010/0290257 A1 Nov. 18, 2010

Related U.S. Application Data

(60) Provisional application No. 61/178,615, filed on May 15, 2009.

(51) Int. Cl.
*H02M 3/156* (2006.01)
(52) U.S. Cl.
USPC ............................................. 363/49; 323/901
(58) Field of Classification Search ............... 363/20, 363/21.01, 49, 50, 131; 323/901
See application file for complete search history.

(56) References Cited

U.S. PATENT DOCUMENTS

| 4,370,701 | A | * | 1/1983 | Western | 363/20 |
| 4,613,934 | A | * | 9/1986 | Pacholok | 363/131 |
| 5,452,195 | A | * | 9/1995 | Lehr et al. | 363/20 |
| 5,812,385 | A | | 9/1998 | Leu | |
| 7,221,128 | B2 | * | 5/2007 | Usui et al. | 323/207 |
| 7,477,532 | B2 | * | 1/2009 | Hall et al. | 363/49 |

\* cited by examiner

*Primary Examiner* — Adolf Berhane
(74) *Attorney, Agent, or Firm* — Keating & Bennett, LLP

(57) ABSTRACT

A start-up circuit includes a switching-device control circuit arranged to receive an input voltage and to provide a switching-device control signal, a switching device arranged to be controlled by the switching-device control signal and to provide a start-up signal, a power-converter control circuit arranged to receive the start-up signal and to provide a power-converter control signal, and a power converter arranged to receive the power-converter control signal and to provide an auxiliary output signal. The switching control circuit is arranged to receive the auxiliary output signal such that, when the auxiliary output signal reaches a predetermined level, the switching-device control circuit stops providing the switching-device control signal.

11 Claims, 4 Drawing Sheets

START-UP CIRCUIT FOR POWER CONVERTERS WITH WIDE INPUT VOLTAGE RANGE

BACKGROUND OF THE INVENTION

1. Field of the Invention

The present invention relates to power converters. More specifically, the present invention relates to start-up circuits that provide start-up voltage to a control system of a power converter during a power-up process when the output voltage rises from zero to a nominal level.

2. Description of the Related Art

According to one conventional start-up technique, an energy storage capacitor placed across the input terminals of a control circuit is charged up to the start-up level through a resistor connected to the input voltage. One drawback of this conventional technique is that the capacitance value and the physical size of the energy storage capacitor must both be relatively large to provide sufficient energy for the startup process to commence. An electrolytic or other polarized type capacitor is typically used for this purpose. Another drawback of this conventional technique is that the current charging the energy storage capacitor, and consequently the start-up time, depends on the input voltage, which limits this conventional technique to being usable only in power converters with relatively narrow input voltage ranges. Moreover, power losses in the charging resistor under steady state conditions of this conventional technique will increase monotonically with the input voltage.

A modification of the above-described start-up technique based on an energy storage capacitor is shown in FIG. 4 of U.S. Pat. No. 5,812,385. The circuit 100 in FIG. 1 is similar to FIG. 4 of U.S. Pat. No. 5,812,385. The start-up circuit 100 in FIG. 1 operates in the following manner. DC voltage is applied to terminals $V_{in+}$ and $V_{in-}$ and charges input filter capacitor 101. Initially, transistor 103 is turned ON by pull-up resistor 106 and charges energy storage capacitor 105 through starting resistor 102 and diode 104. When voltage across energy storage capacitor 105 reaches a specific level, control circuit 112 is activated. The activated control circuit 112 supplies a CONTROL signal to converter 113 that starts the converter 113, which in turn supplies a control circuit bias voltage though diode 111. This control circuit bias voltage reverse biases diode 104 and supplies current to the control circuit 112. Control circuit 112 then supplies a VREF signal to transistor 107 through base current limiting resistor 109. The VREF signal turns the transistor 107 ON, which in turn turns transistor 103 OFF, saving power from being dissipated through resistor 102. During the power saving mode of control circuit 112, the CONTROL signal supplied to the converter 113 turns OFF, which causes the voltage supplied through diode 111 to capacitor 105 to begin to decay. When the voltage across capacitor 105 drops to a predetermined level, the control circuit 112 turns OFF and the VREF signal drops to zero, turning transistor 107 OFF and transistor 103 ON to restore power supplied from the DC input. This operation occurs in a cycle-by-cycle basis during the power saving mode of operation.

However, this conventional technique does not fully eliminate start-up power dissipation. Charging resistor 102 does not dissipate power under a steady state condition because, when transistor 103 is OFF, resistor 106 is still connected across the input DC voltage of capacitor 101 though closed transistor 107. If the input voltage range is relatively narrow, power dissipation in resistor 106 will be relatively low and can be discounted. However, if the input DC voltage has a wide range, then power dissipation in resistor 106 cannot be neglected because power dissipation increases directly proportional to the square of the input DC voltage. Assuming, for example, a 10:1 input voltage range and a 100 mW dissipation in resistor 106 at low input voltage, then the power dissipated in resistor 106 at high input voltage will be 0.1 W*(10)²=10 W. This is a significant change in the power dissipated by resistor 106.

Accordingly, the above conventional technique is undesirable because it requires the capacitor 105 to be relatively expensive, large value, and physical size, because it does not have a fixed start-up time, and the power dissipation losses under steady state conditions limit start-up circuits based on energy storage capacitors to only those that have a relatively narrow input voltage range.

Another conventional start-up technique is illustrated in FIG. 2. A start-up circuit 200 includes a start-up transistor 201, first diode 202, resistor 203, zener diode 204, filter capacitor 205, second diode 206, and power converter 207 with control circuit 208 and with auxiliary output terminals 209, 210.

The start-up circuit 200 in FIG. 2 operates in the following manner. After the input voltage $V_{in}$ is applied to terminals $V_{in+}$, $V_{in-}$, resistor 203 supplies current to zener diode 204 and to the base of transistor 201. Transistor 201 supplies a start-up voltage at the input of the control circuit 208 and across the filter capacitor 205 equal to the zener voltage $V_z$ of the zener diode 204 minus the combined voltage drops of transistor 201 and first diode 202. The start-up voltage reverse biases the second diode 206 and is supplied to the control circuit 208, which initiates the start-up process of the power converter 207. During this start-up process, the output voltage supplied by power converter 207 to the LOAD and the auxiliary voltages supplied by power converter 207 to auxiliary output terminals 209, 210 rise to their nominal levels. Because the start-up current for the control circuitry 208 is supplied by the transistor 201 that is controlled by the fixed zener voltage $V_z$ of the zener diode 204, the control circuitry 208 functions independently of the input voltage. Thus, the start-up time is independent of the input voltage $V_{in}$.

Another significant difference is that filter capacitor 205 functions as a filter capacitor rather than an energy storage capacitor as the energy storage capacitor 105 depicted in FIG. 1. It should be noted that this capacitor 205 is not essential to circuit operation and is solely used for noise reduction. Because the filter capacitor 205 has a different function than energy storage capacitor 105, the value and size of filter capacitor 205 can be significantly smaller than energy storage capacitor 105. Additionally, capacitor 205 also can be a multi-layer ceramic capacitor, which provides savings in product cost in comparison to the cost of the energy storage capacitor 105.

When the auxiliary voltage across auxiliary output terminals 209, 210 exceeds the start-up voltage at the input of the control circuit 208, second diode 206 is forward biased, first diode 202 is reversed biased, transistor 201 switches to the OFF state, and auxiliary power from output terminals 209, 210 is supplied to the control circuit 208.

The resistance value R of resistor 203 is selected in accordance with the following equation:

$$R = (V_{in\,min} - V_z)/I_{min} \qquad (1)$$

where $V_{in\,min}$ is the minimum input voltage and $I_{min}$ is the minimum current in the resistor R needed both to activate zener diode 204 and to supply base current to the transistor 201. At input voltages greater than $V_{in\,min}$, the current I through the resistor 203 increases according to the formula:

$$I = (V_{in} - V_z)/R \qquad (2)$$

Power dissipation P in the resistor 203 at high input voltage $V_{in\ max}$ is defined by the following formula, which is based on the equations (1) and (2):

$$P = I_{min} * (V_{in\ max} - V_z)^2 / (V_{in\ min} - V_z) \quad (3)$$

If the input voltage range is narrow, the power dissipation P in the resistor 203 is not significant and can practically be neglected. However, if the input voltage range is wide, the power dissipation P requires a physically larger resistor size, thus causing overall efficiency deterioration and an increasing no-load current. For example, consider a power converter with output power of Po=100 W and efficiency η=90% at minimum input voltage $V_{in\ min}$=16 V, with $V_z$=12 V and $I_{min}$=1.5 mA. Power dissipation P in the resistor 203 calculated according to the formula (3) and efficiency η for $V_{in\ max}$ levels of 36 V, 75 V, and 150 V are shown in Table 1.

TABLE 1

| | $V_{in\ max}$ (V) | | |
|---|---|---|---|
| | 36 | 75 | 150 |
| P (W) | 0.22 | 1.49 | 7.14 |
| η (%) | 89.83 | 88.82 | 84.57 |

The above example demonstrates that the conventional start-up circuit 200 of FIG. 2 is efficient enough in a relatively narrow input voltage range and is not efficient in a wide input voltage range. In the above example, at high input voltage $V_{in}$=150 V, the efficiency drops by (90%−84.57%)=5.43%, and the rated power of the resistor 203 must be increased to tolerate power dissipation of 7.14 W.

Thus, there is a need in the power conversion field for a more efficient start-up circuit for power converters with a wide input voltage range.

SUMMARY OF THE INVENTION

To overcome the problems described above, preferred embodiments of the present invention provide a more efficient start-up circuit for power converters with wide input voltage range.

According to preferred embodiments of the present invention, a start-up circuit includes a switching-device control circuit arranged to receive an input voltage and to provide a switching-device control signal, a switching device arranged to be controlled by the switching-device control signal and to provide a start-up signal, a power-converter control circuit arranged to receive the start-up signal and to provide a power-converter control signal, and a power converter arranged to receive the power-converter control signal and to provide an auxiliary output signal. The switching control circuit is arranged to receive the auxiliary output signal such that, when the auxiliary output signal reaches a predetermined level, the switching-device control circuit stops providing the switching-device control signal.

The switching-device control circuit preferably includes a resistor arranged to receive the input voltage, a second switching device connected in series with the resistor, and a constant-voltage device connected to the second switching device and arranged to provide the switching-device control signal. The constant-voltage device is preferably a zener diode. When the auxiliary output signal reaches a predetermined level, the second switching device is preferably turned off such that no current flows through the resistor. The switching-device control circuit further preferably includes a third switching device arranged to receive the auxiliary output signal and to provide a second-switching-device control signal to the second switching device. The switching-device control circuit further preferably includes a delay circuit connected to the third switching device and arranged to delay the third switching device from stopping providing the second-switching-device control signal. The delay circuit is preferably an RC circuit.

The start-up circuit preferably includes a filter capacitor connected to the switching device. When the auxiliary output signal reaches a predetermined level, the switching device preferably stops providing the start-up signal and the power-converter control circuit receives the auxiliary output signal. A start-up circuit preferably includes a first diode connected between the switching device and the power-converter control circuit and a second diode connected between the power-converter control circuit and the power converter. The power converter is preferably arranged to supply power to a load when the power converter receives the power-converter control signal.

Other features, elements, characteristics, methods, steps and advantages of the present invention will become more apparent from the following detailed description of preferred embodiments of the present invention with reference to the attached drawings.

DETAILED DESCRIPTION OF PREFERRED EMBODIMENTS

Figure 2:
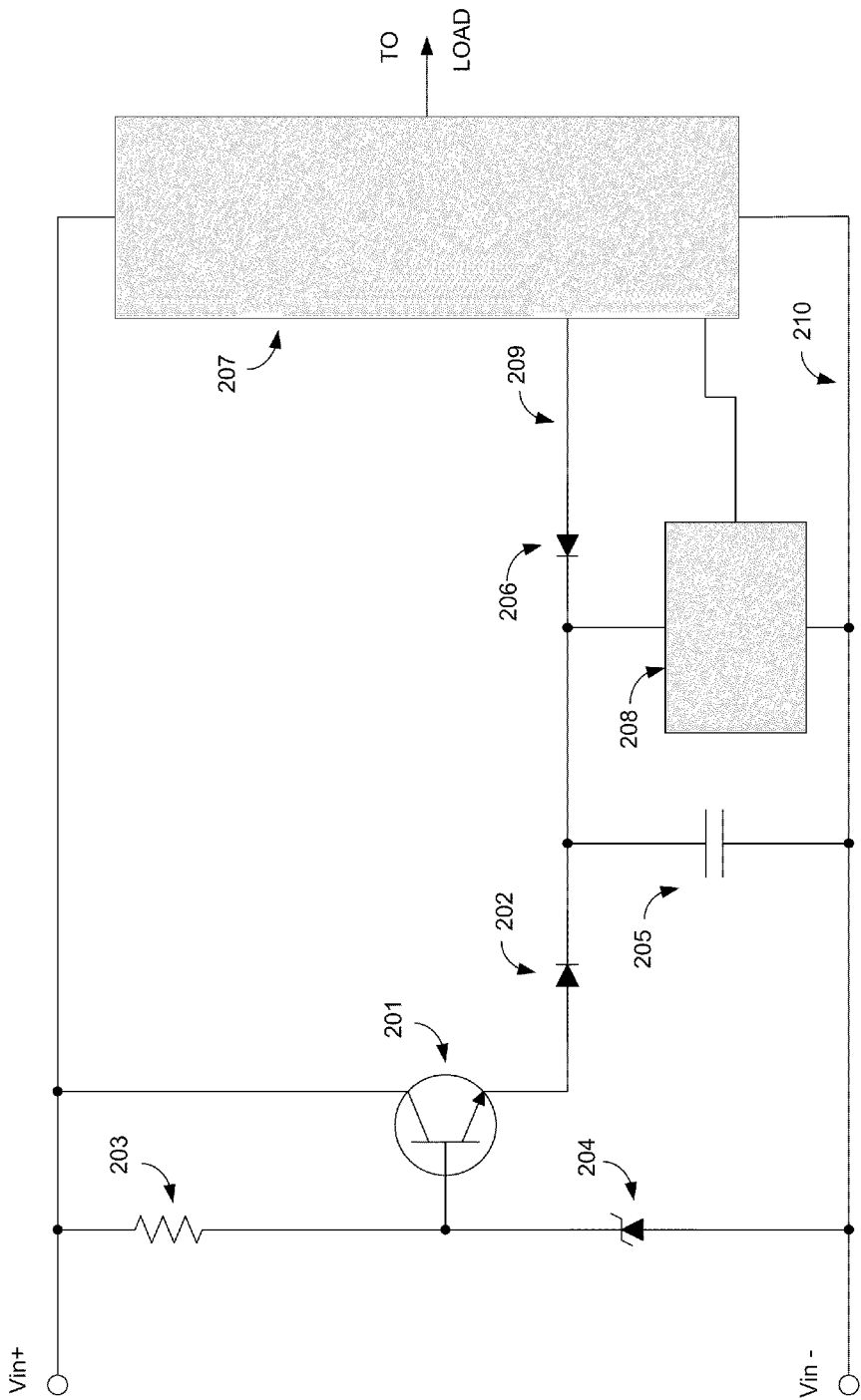
FIG. 2 shows a conventional start-up circuit based around a start-up transistor.
Figure 3:
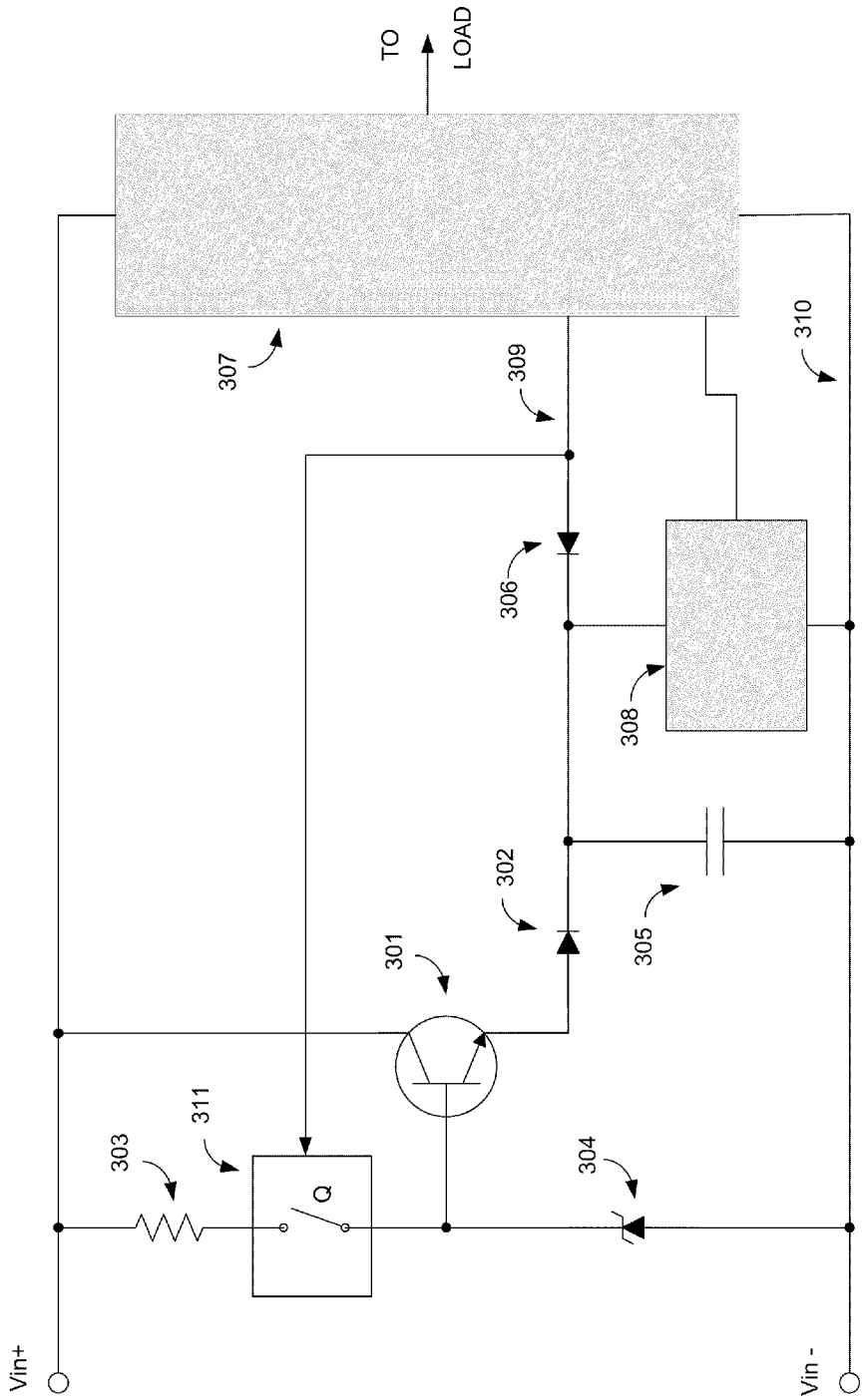
FIG. 3 shows a start-up circuit according to a first preferred embodiment of the present invention.

FIG. 3 shows a start-up circuit 300 according to the first preferred embodiment of the present invention that includes start-up transistor 301, first diode 302, resistor 303, zener diode 304, capacitor 305, second diode 306, power converter 307 with control circuit 308 and with auxiliary output terminals 309, 310, and switch Q with control circuit 311. In contrast to FIG. 2, FIG. 3 includes a switch Q that is controlled by the voltage across auxiliary output terminals 309, 310 and that is connected in series with resistor 303.

The start-up circuit 300 in FIG. 3 operates in the following manner. After the input voltage $V_{in}$ is applied across terminals $V_{in+}$, $V_{in−}$, zener diode 304 is activated through resistor 303 and switch Q that is initially ON. Transistor 301 supplies a start-up voltage at the input of the control circuit 308 and across filter capacitor 305 equal to the zener voltage $V_z$ of the zener diode 304 minus the combined voltage drops of transistor 301 and first diode 302. The start-up voltage reverse biases the second diode 306 and is applied to the control circuit 308, which initiates the start-up process of the power converter 307. During this start-up process, the output voltage supplied by the power converter 307 to the LOAD and auxiliary voltages supplied by the power converter 307 to auxiliary output terminals 309, 310 rise to their nominal levels. The start-up current for the control circuit 308 is supplied by the transistor 301 controlled by the fixed zener voltage $V_z$ of the zener diode 304 independent of the input voltage $V_{in}$, resulting in a fixed start-up time over the entire input voltage range.

It is possible to use any constant voltage element, e.g. voltage reference, shunt regulator, etc., instead of zener diode 304.

When the auxiliary voltage across auxiliary output terminals 309, 310 reaches a predetermined level, control circuit 311 turns switch Q to the OFF state, causing transistor 301 to also switch OFF. Once the transistor 301 switches OFF, the first diode 302 becomes reversed biased, second diode 306 becomes forward biased, and auxiliary power from output terminals 309, 310 is supplied to the control circuit 308.

Accordingly, the resistor 303 now only conducts during the start-up process (typically for about a couple of milliseconds) when switch 311 is in the ON state. At steady state power, power dissipation in the start-up circuit 300 shown in FIG. 3 is eliminated or nearly eliminated because the resistor 303 is not conducting. Thus, each of increasing efficiency, decreasing a required physical size of the resistor 303, and decreasing the level of no-load current can be achieved with the arrangement shown in FIG. 3.

The start-up current for control circuitry 308 is supplied by the transistor 301 that is controlled by the fixed zener voltage $V_z$ of the zener diode 304 such that the transistor 301 operates independent of the input voltage $V_{in}$. Accordingly, because the transistor 301 operates independently from the input voltage $V_{in}$, the start-up time is also independent of the input voltage $V_{in}$.

Accordingly, because the start-up circuit 300 does not create any losses at steady state, the start-up circuit in FIG. 3 is suitable for power converters working in wide input voltage ranges.

Figure 1:
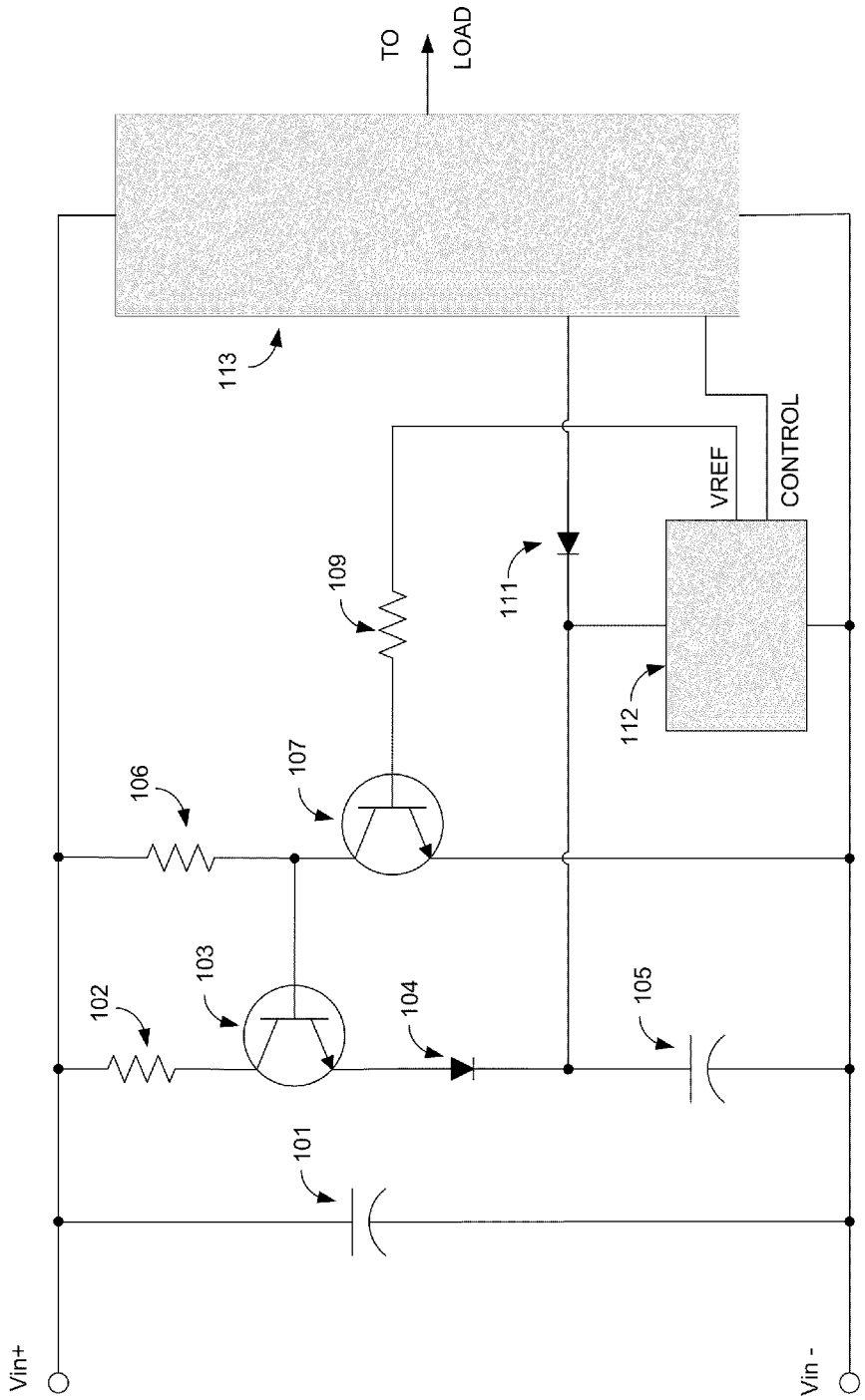
FIG. 1 shows a conventional start-up circuit based around an energy storage capacitor.

Another significant advantage is that the capacitor 305 functions as a filter capacitor rather than an energy storage capacitor as the energy storage capacitor 105 depicted in FIG. 1. Because the capacitor 305 has a different function than the energy storage capacitor 105, the value and size of capacitor 305 can be significantly smaller than energy storage capacitor 105. Additionally, capacitor 305 can also be a multi-layer ceramic capacitor, which provides a savings in product cost in comparison to the cost of the energy storage capacitor 105. Further, it should be noted that capacitor 305 is not essential to circuit operation and is solely used for noise reduction.

Figure 4:
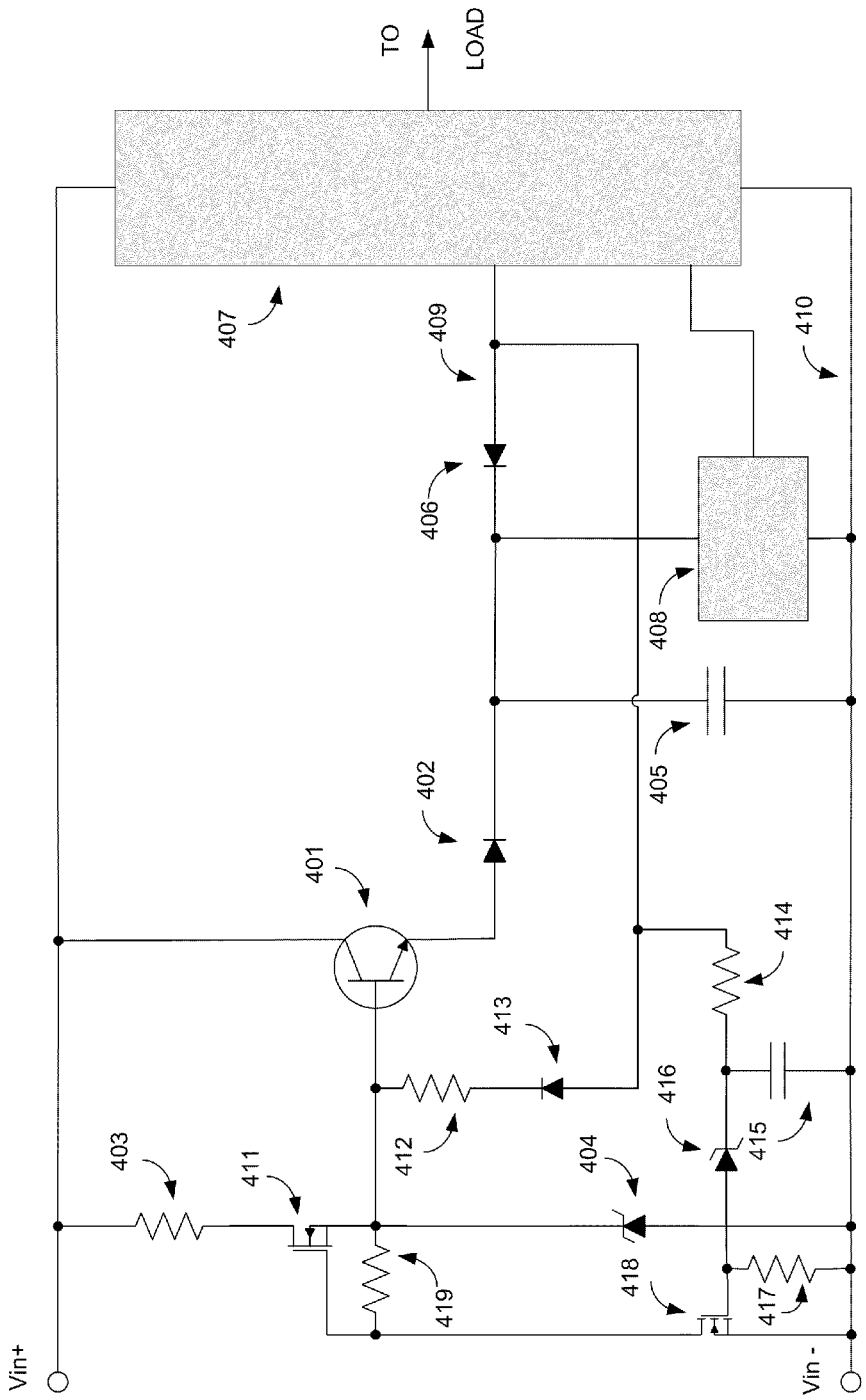
FIG. 4 shows a start-up circuit according to a second preferred embodiment of the present invention.

FIG. 4 shows start-up circuit 400 according to a second preferred embodiment of the present invention that includes a start-up transistor 401, first diode 402, resistor 403, first zener diode 404, filter capacitor 405, second diode 406, power converter 407 with control circuit 408 and with auxiliary output terminals 409, 410, switch 411 (which is preferably a depletion mode N-channel MOSFET, but could be any other desirable switching element), additional switch 418 (which is preferably a N-channel MOSFET, but could be any other desirable switching element), second zener diode 416, RC circuit formed by resistor 414 and capacitor 415, third diode 413, and resistors 412, 417, 419.

The start-up circuit 400 in FIG. 4 is a variant of the circuit in FIG. 3, where switch Q is preferably provided by a depletion mode N-channel MOSFET and where control circuit 311 is preferably provided by a combination of MOSFET 418 and various passive components. The start-up circuit 400 in FIG. 4 operates in the following manner. After input voltage $V_{in}$ is applied to terminals $V_{in+}$, $V_{in-}$, first zener diode 404 is activated through resistor 403 and switch 411 that is normally ON, transistor 401 supplies a start-up voltage at the input of control circuit 408 and across filter capacitor 405, second diode 406 and third diode 413 become reverse biased, and the start-up voltage is applied to the control circuit 408, which initiates the start-up process of the power converter 407. During this start-up process, the output voltage supplied by the power converter 407 to the LOAD and the auxiliary voltages supplied by the power converter 407 to auxiliary output terminals 409, 410 rise to their nominal levels. The start-up current for control circuit 408 is supplied by transistor 401 controlled by the fixed zener voltage $V_z$ of the zener diode 404 independent of the input voltage $V_{in}$, resulting in a fixed start-up time over the entire input voltage range. It is possible to use any constant voltage element, e.g. voltage reference, shunt regulator, etc., instead of zener diode 404.

When the auxiliary voltage across auxiliary output terminals 409, 410 reaches the combined level determined by the gate-to-source turn-on threshold of switch 418 and zener voltage $V_z$ of the second zener diode 416, switch 418 switches to the ON state, the gate-to-source voltage of the switch 411 becomes negative and switch 411 switches OFF, causing transistor 401 also to switch OFF. When the transistor 401 switches OFF, the first diode 402 becomes reverse biased, diode 406 becomes forward biased, and auxiliary power from output terminals 409, 410 is supplied to control circuit 408.

Accordingly, resistors 412, 419 are arranged to define the negative gate-to-source voltage of the switch 411. The RC circuit defined by resistor 414 and capacitor 415 and second zener diode 416 is arranged to create a delay in the turn-on process of the switch 418, which allows sufficient time for the system to start-up and become stable. Resistor 417 is arranged to ensure that the switch 418 will be OFF in an initial state.

Resistor 403 is similar to resistor 303 in FIG. 3 in that resistor 403 only conducts during the start-up process (typically for about a couple of milliseconds) when switch 411 is in the ON state. At steady state power, power dissipation in the start-up circuit 400 shown in FIG. 4 is eliminated or nearly eliminated because the resistor 403 is not conducting. Thus, each of increasing efficiency, decreasing a required physical size of the resistor 403, and decreasing the level of no-load current can be achieved with the arrangement shown in FIG. 4.

The start-up current for control circuitry 408 is supplied by the transistor 401 that is controlled by the fixed zener voltage $V_z$ of the first zener diode 404 such that the transistor 401 operates independent of the input voltage $V_{in}$. Accordingly, because the transistor 401 operates independently from the input voltage $V_{in}$, the start-up time is also independent of the input voltage $V_{in}$.

Accordingly, because the start-up circuit 400 does not create any losses at steady state, the start-up circuit in FIG. 4 is suitable for power converters working in wide input voltage ranges.

Similar to the capacitor 305 in FIG. 3, capacitor 405 functions as a filter capacitor rather than an energy storage capacitor like the energy storage capacitor 105 shown in FIG. 1. Since the capacitor 405 has a different function than energy storage capacitor 105, the value and size of capacitor 405 can be significantly smaller than energy storage capacitor 105. Additionally, capacitor 405 can also be a multi-layer ceramic capacitor, which provides a savings in product cost in comparison to the cost of the energy storage capacitor 105. Further, it should be noted that this capacitor 405 is not essential to circuit operation and is solely used for noise reduction.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A start-up circuit comprising:
   a switching-device control circuit arranged to receive an input voltage and to provide a switching-device control signal;
   a switching device arranged to be controlled by the switching-device control signal, to receive the input voltage, and to provide a start-up signal;
   a power-converter control circuit arranged to receive the start-up signal and to provide a power-converter control signal; and
   a power converter arranged to receive the power-converter control signal and to provide an auxiliary output signal; wherein
   the switching-device control circuit is arranged to receive the auxiliary output signal such that, when the auxiliary output signal reaches a predetermined level, current of the input voltage flowing through the switching device and current of the input voltage flowing through the switching-device control circuit are interrupted, causing the switching device to stop providing the start-up signal.

2. A start-up circuit of claim 1, wherein the switching-device control circuit includes:
   a resistor arranged to receive the input voltage;
   a second switching device connected in series with the resistor; and
   a constant-voltage device connected to the second switching device and arranged to provide the switching-device control signal.

3. A start-up circuit of claim 2, wherein the constant-voltage device is a zener diode.

4. A start-up circuit of claim 2, wherein, when the auxiliary output signal reaches a predetermined level, the second switching device is turned off such that no current flows through the resistor.

5. A start-up circuit of claim 2, wherein the switching-device control circuit further includes a third switching device arranged to receive the auxiliary output signal and to provide a second-switching-device control signal to the second switching device.

6. A start-up circuit of claim 5, wherein the switching-device control circuit further includes a delay circuit connected to the third switching device and arranged to delay the third switching device from stopping providing the second-switching-device control signal.

7. A start-up circuit of claim 6, wherein the delay circuit is an RC circuit.

8. A start-up circuit of claim 1, further comprising a filter capacitor connected to the switching device.

9. A start-up circuit of claim 1, wherein, when the auxiliary output signal reaches a predetermined level, the switching device stops providing the start-up signal and the power-converter control circuit receives the auxiliary output signal.

10. A start-up circuit of claim 1, further comprising:
    a first diode connected between the switching device and the power-converter control circuit; and
    a second diode connected between the power-converter control circuit and the power converter.

11. A start-up circuit of claim 1, wherein the power converter is arranged to supply power to a load when the power converter receives the power-converter control signal.

* * * * *